United States Patent [19]

Earle

[11] Patent Number: 4,574,764

[45] Date of Patent: Mar. 11, 1986

[54] FUEL VAPORIZATION METHOD AND APPARATUS

[76] Inventor: John L. Earle, 69-536 Crestview Dr., Desert Hot Springs, Calif. 92240

[21] Appl. No.: 734,190

[22] Filed: May 15, 1985

Related U.S. Application Data

[63] Continuation of Ser. No. 371,345, Apr. 23, 1982, abandoned.

[51] Int. Cl.$^4$ ............................................ F02M 31/00
[52] U.S. Cl. .................................... 123/545; 123/590; 123/548; 261/144
[58] Field of Search ............... 123/557, 548, 545, 546, 123/590, 585, 586, 588; 48/180 H; 165/51, 52; 261/144, 145

[56] References Cited

U.S. PATENT DOCUMENTS

| | | | |
|---|---|---|---|
| 1,413,985 | 4/1922 | Hodges | 123/588 |
| 1,553,477 | 9/1925 | Smith | 123/548 |
| 1,564,547 | 12/1925 | Farkar | 123/586 |
| 1,658,538 | 2/1928 | Scott | 261/144 |
| 1,737,196 | 11/1929 | Mortenson | 123/586 |
| 2,153,350 | 4/1939 | Stimac | 123/586 |
| 2,956,791 | 10/1960 | Johnson | 261/145 |
| 3,762,385 | 10/1973 | Hollnagel | 123/545 |
| 4,044,741 | 8/1977 | Swingley | 123/545 |
| 4,212,274 | 7/1980 | Quich | 123/548 |
| 4,338,906 | 7/1982 | Cox | 123/548 |

FOREIGN PATENT DOCUMENTS

| 1136 | 3/1931 | Australia | 123/545 |
|---|---|---|---|
| 760456 | 10/1956 | United Kingdom | 123/548 |

*Primary Examiner*—Ronald H. Lazarus
*Attorney, Agent, or Firm*—James C. Wray

[57] ABSTRACT

Carburetor air-fuel mixtures are directed to a manifold having a plurality of long, small diameter helical tubes extending upwardly therefrom. An auxiliary air inlet having an auxiliary choke and an auxiliary air throttle supplies air to mixtures entering the tubes in response to engine temperature and carburetor throttle.

Heated engine coolant flows upwardly through a jacket enclosing the tubes. An outlet manifold receives air-fuel mixtures vaporized in the tubes and directs them to the engine intake manifold. The carburetor is mounted on a block having an air-fuel passageway extending from a top inlet to a side outlet. The block is mounted atop a block having a passageway having a side inlet which receives vaporized air-fuel mixtures from the tubes to a bottom outlet in communication with the intake manifold.

9 Claims, 1 Drawing Figure

U.S. Patent  Mar. 11, 1986  4,574,764
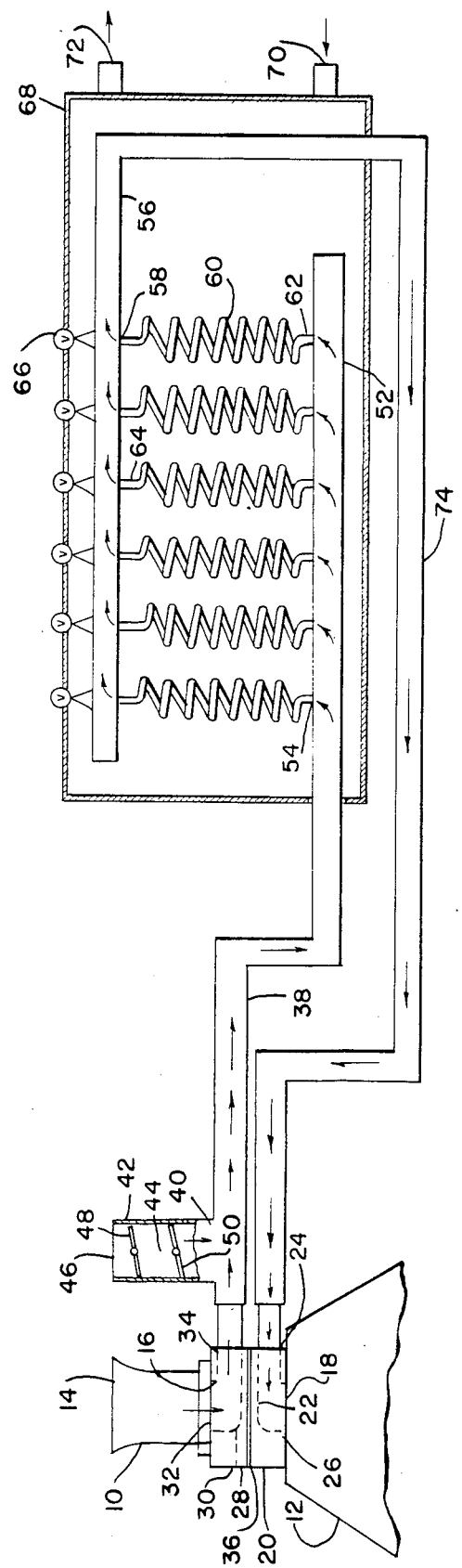

FUEL VAPORIZATION METHOD AND APPARATUS

This application is a continuation of application Ser. No. 371,345, filed April 23, 1982 now abandoned.

BACKGROUND OF THE INVENTION

This invention relates generally to fuel vaporization and more particularly has reference to an apparatus and method for supplying fully vaporized air-fuel mixtures to the intake manifold of an internal combustion engine.

Pertinent U.S. and foreign patents are found in Class 123, subclasses 543, 545, 548 and 586; Class 241, subclasses 145, and Class 261, subclass 144, of the Official Classifications of Patents in the U.S. Patent and Trademark Office.

Examples of pertinent patents are U.S. Pat. Nos. 2,232,748; 3,496,919; 3,762,385; 3,780,714; 4,068,638; 4,192,270 and 4,212,274.

U.S. Pat. No. 2,232,784 discloses a device for supplying auxiliary air into the carburetor system of an internal combustion engine. The device has automatic control means for varying the amount of air supplied at various throttle openings.

U.S. Pat. No. 3,496,919 discloses a carburetor for delivering fuel from a fuel tank to an engine combustion chamber in vaporized form. A vaporizing chamber has an inlet and an outlet and internal surfaces in contact with a heat exchanger. The heat exchanger is connected to the exhaust gas conduit of the engine. In the vaporizing chamber, the fuel mixture progresses upwardly in a sinuous flow in heat exchange relation with surfaces heated by the exhaust gases of the engine which are conducted from the exhaust of the engine through a conduit into a heat intake passage extending lengthwise of the chamber.

U.S. Pat. No. 3,762,385 discloses an air-fuel preheater for an internal combustion engine wherein a water-jacketed fuel vaporizing chamber is interposed between the carburetor and the intake manifold. The flow path in the chamber is tortuous and of considerable length which induces some turbulence and insures vaporization of the gasoline.

U.S. Pat. No. 3,780,714 discloses a fuel vaporizer for internal combustion engines in which a tubing is tightly coiled in a frusto-conical shape and is vertically installed within the intake manifold chamber below and in common mounting arrangement with a conventional carburetor for pre-heating and vaporizing the liquid fuel emitted from the throat of the carburetor. The coiled tubing has opposing open ends that are connected to the water cooling system of the engine and function as inlet and outlet ends for the thermostatically controlled passage of hot water through the coils.

U.S. Pat. No. 4,068,638 discloses a method and apparatus for increasing the vaporized proportion of a stream of volatile liquid fuel supplied to an internal combustion engine. The non-volatized portions of the fuel discharged from the carburetor are traveled over a plurality of flow surfaces, such as the surfaces of a layer of metal balls and the like. In addition, a coil of tubing is also preferably provided with one end arranged to receive fresh air heated by the exhaust manifold of the engine and with the other end downwardly directed from the layer of balls to the intake manifold.

U S. Pat. No. 4,192,270 discloses a fuel system for an internal combustion engine in which an air-gasoline mixture from the carburetor is fed through a plurality of chambers and through a plurality of curved, horizontally positioned, heated tubes which output the mixture to the intake manifold of the engine.

U.S. Pat. No. 4,212,274 discloses a carbonation enhancer having a cylindrical shell that is closed at one end by an envolute wall spaced from the inner end of a withdrawal tube. The output stream of a conventional carburetor is directed tangentially into space between the shells and caused to move in a spiral path toward the envolute enclosure wall by a spiral vane in the space, and on reaching the envolute wall to move radially inwardly and into the inner end of the withdrawal tube to travel axially in a direction opposite the spiral path with the stream exiting the tube to enter the inlet manifold of the engine. Waste engine heat is applied to the exterior of the cylindrical shell in an amount sufficient to vaporize liquid fuel droplets centrifuged thereagainst from the stream as the latter traverses the spiral path portion of its travel from the carburetor to the intake manifold.

Gasoline as a liquid does not burn. Conventional carburetors spray the gasoline into an inducted air stream. The spray is not completely vaporized before combustion.

Many attempts have been made to fully vaporize the fuel in the air stream. Most of these attempts provided means for heating the fuel in the carburetor, resulting in so-called high mileage carburetors. Such devices are undesirable because they require replacement or modification of the conventional carburetor provided as standard equipment on the automobile.

Other attempts to fully vaporize the fuel in the air stream have been unsuccessful because of poor performance and undue complexity.

SUMMARY OF THE INVENTION

The present invention overcomes many of the problems which exist in the prior art.

The invention relates generally to a device that may be installed on a conventional gasoline engine, such as those normally found in automobiles, to provide better fuel vaporization which in turn results in improved efficiency and economy of operation.

More specifically, the invention consists of a device to fully vaporize the air-fuel mixture leaving the standard carburetor of an engine before the mixture enters the intake valves of the engine.

The device of the present invention is normally connected between the carburetor and the intake manifold. In one embodiment, two blocks are installed between the carburetor and the intake manifold. Side ports on these blocks allow the carburetor air-fuel mixture to be diverted away from the manifold to the vaporizing apparatus and to be received after vaporization and transmitted into the intake manifold.

An air-fuel mixture from the standard carburetor is conducted through an auxiliary leaning air input device having an auxiliary choke controlled by engine temperature and an auxiliary throttle linked to the existing carburetor throttle. The air-fuel mixture leaving the leaning device is leaner than and little more vaporized than a conventional carburetor air-fuel mixture. In other words, it is a fuel mist, fuel vapor and air mixture.

The mixture from the leaning air device is piped to a manifolding arrangement that feeds a plurality of vertical axis helical tubes with inlets at the bottom and outlets at the top. The tubes have small diameters and relatively long lengths. The tubes are enclosed by a water jacket which receives heated engine coolant.

The tubes achieve fuel vaporization through several techniques.

Heat communicated from the engine coolant to the air-fuel mixture flowing through the tubes enhances vaporization by known processes.

The upward flow of the air-fuel mixture in the tubes causes the heavier unvaporized droplets to sink for more vaporization. The vaporized portions of the mixture readily rise in the tubes and are transmitted to the intake manifold. The helical shape of the tubes sets up centrifugal forces in the air-fuel mixture flowing therethrough. The heavier droplets of fuel tend to be flung against the walls of the helical tubes. Air passing over these deposited drops causes some vaporization. The heavier drops also tend to sink so that the air-fuel mixtures emitted at the tops of the tubes are more perfectly vaporized.

Because the tubes have small diameters, a sizeable difference in velocity exists between the center of each tube and the portions adjacent the walls of the tubes. This difference creates turbulence which enhances vaporization of the air-fuel mixture flowing through the tubes.

The long flow path presented by the tubes enhances vaporization because it increases the transit time between the carburetor and the intake manifold, thereby allowing more time than normal for vaporization.

In short, the vaporizing device of the present invention enhances vaporization by serving as a centrifuge, heat exchanger and long-path diffusion vaporizer.

Objects of the invention are, therefore, to provide an improved apparatus and method for fuel vaporization and to provide an effective, efficient and economical apparatus and method for vaporizing air-fuel mixtures supplied by a conventional carburetor of an internal combustion engine.

Another object of the invention is to provide an improved vaporization apparatus and method which results in more efficient operation of the engine.

A further object of the invention is to provide an apparatus and method for fully vaporizing the air-fuel mixture leaving the carburetor of an engine.

A further object of the invention is to provide an apparatus and method which enhances vaporization of the air-fuel mixture by centrifugal action, heat exchange and long-path diffusion vaporization.

A further object of the invention is to provide fuel vaporization apparatus for use with an internal combustion engine having an intake manifold and a carburetor which supplies mixtures of air and volatile liquid fuel comprising passageway means for guiding carburetor fuel-air mixtures substantially upwardly from lower inlet means to upper outlet means to vaporize fuel, first conduit means for communicating fuel-air mixtures from the carburetor to the lower intake means, and second conduit means for communicating vaporized fuel-air mixtures from the upper outlet means to the intake manifold.

A further object of the invention is to provide fuel vaporization apparatus for vaporizing mixtures of air and volatile liquid fuels supplied to an engine comprising passageway means for guiding the air-fuel mixture to a combustion chamber in the engine, said passageway means having a relatively large length to diameter ratio.

Still another object of the invention is to provide fuel vaporization apparatus for vaporizing mixtures of air and volatile liquid fuel supplied to an engine comprising one or more small diameter tubes for guiding the air-fuel mixture to a combustion chamber in the engine.

A further object of the invention is to provide an internal combustion engine having an intake manifold, a carburetor which supplies mixtures of air and volatile liquid fuel, and a fuel vaporizer, the improvement comprising a first block mounted on the intake manifold having a passageway extending therethrough from a side inlet opening in communication with the interior of the fuel vaporizer to a bottom outlet opening in communication with the interior of the intake manifold and a second block mounted on the first block having a passageway extending therethrough from a top inlet opening in communication with the interior of the carburetor to a side outlet opening in communication with the interior of the fuel vaporizer, all fuel-air mixtures communicated from the carburetor to the intake manifold passing through the fuel vaporizer.

Yet another object of the invention is to provide fuel vaporization apparatus for use with an internal combustion engine having a carburetor which supplies mixtures of air and volatile liquid fuel to one or more conduits for communication to an intake manifold and further having a circulating liquid cooling system comprising jacket means enclosing the conduits for holding liquid in contact with the outer surface of the conduits, said jacket means having lower inlet means for receiving heated liquid from the cooling system and upper outlet means for returning liquid to the cooling system.

Another object of the invention is to provide auxiliary air supply apparatus for use with an internal combustion engine having a fuel vaporizer and a carburetor which supplies mixtures of air and volatile liquid fuel comprising conduit means for communicating carburetor air-fuel mixtures to the fuel vaporizer, said conduit means having port means for providing communication from the atmosphere to the interior of the conduit means, said port means being provided with an auxiliary choke means for controlling flow through the opening in response to the engine temperature and auxiliary air throttle means for controlling flow through the opening in response to the setting of the carburetor throttle.

A further object of the invention is to provide a fuel vaporizing method for use with an internal combustion engine having an intake manifold and a carburetor which supplies mixtures of air and volatile liquid fuel comprising communicating air-fuel mixtures from the carburetor to a lower inlet, guiding carburetor air-fuel mixtures substantially upwardly from the lower inlet to an upper outlet to vaporize fuel, and communicating vaporized air-fuel mixtures from the upper outlet to the intake manifold.

Yet another object of the invention is to provide a fuel vaporization method for vaporizing mixtures of air and volatile liquid fuel supplied to an engine comprising guiding the air-fuel mixtures to a combustion chamber in the engine through a passageway having a relatively large length to diameter ratio to effect vaporization by turbulence set up in the passageway and by the long transit time to the combustion chamber.

Still another object of the invention is to provide a fuel vaporization method for vaporizing mixtures of air and volatile liquid fuel supplied to an engine comprising guiding the air-fuel mixture to a combustion chamber in the engine through one or more small diameter tubes to effect vaporization by turbulence set up within the tubes.

A further object of the invention is to provide an auxiliary air supply method for use with an internal combustion engine having a fuel vaporizer and a carburetor which supplies mixtures of air and volatile liquid fuel comprising communicating carburetor air-fuel mixtures to the fuel vaporizer through a conduit having a port which provides communication from the atmosphere to the interior of the conduit, controlling flow through the opening in response to engine temperature, and controlling flow through the opening in response to the setting of a carburetor throttle.

A further object of the invention is to provide a fuel vaporizing apparatus for use with an internal combustion engine having an intake manifold and a down draft carburetor which supplies mixtures of air and volatile liquid fuel comprising passageway means for guiding carburetor air-fuel mixtures in a flow direction substantially opposite the flow of the carburetor from the lower inlet means to upper outlet means to vaporize fuel, first conduit means for communicating air-fuel mixtures from the carburetor to the lower inlet means, second conduit means for communicating vaporized air-fuel mixtures from the upper outlet means to the intake manifold, the passageway means comprising one or more tubes, the inlet means comprising a manifold having an inlet connected to the first conduit means and plural outlets connected to the lower ends of the plural passageways, the outlet means comprising a manifold having plural inlets connected to upper ends of the one or more tubes and an outlet connected to the second conduit means, mounting means mounted between the intake manifold and the carburetor, having a first passageway extending therethrough from a side inlet opening in communication with the upper outlet means to a bottom outlet opening in communnication with the interior of the intake manifold and a second passageway extending therethrough from a top inlet opening in communication with the interior of the carburetor to a side outlet opening in communication with the lower inlet means, all air-fuel mixtures communicated from the carburetor to the intake manifold passing through the passageway means, and means for heating the passageway means.

These and other and further objects and features of the invention are apparent in the disclosure which includes the above and below specification and claims and drawings.

BRIEF DESCRIPTION OF THE DRAWINGS

The FIG. is a diagrammatic sketch of a fuel vaporization system embodying features of the present invention.

DETAILED DESCRIPTION OF THE DRAWINGS

The figure shows the fuel vaporization system of the present system used with a conventional internal combustion engine. The down draft carburetor 10 and intake manifold 12 are standard components of the engine, the design and construction of which are well known to any person of ordinary skill in the art. As is well known, the carburetor 10 sucks in atmospheric air through a top opening 14 and sprays gasoline into the inducted air stream. The air-fuel mixture, which is not fully vaporized, is expelled through a bottom opening 16. The intake manifold 12 has a top opening 18 which receives air-fuel mixtures for distribution to the engine cylinders (not shown), as is well known.

A block 20 is mounted atop the intake manifold 12. The block 20 has a passageway extending therethrough from a side opening 24 to a bottom opening 26. The bottom opening 26 is aligned with and in communication with the top opening 18 in the intake manifold 12. A block 28 is mounted atop the block 20. The block 28 has a passageway 30 extending therethrough from a top opening 32 to a side opening 34. The top opening 32 is aligned with and in communication with the bottom opening 16 of the carburetor 10.

A wall 36 is sandwiched between the blocks 20 and 28.

A conduit 38 has one end connected to the block 28 so that the side opening 34 is in communication with the interior of the conduit 38.

The conduit 38 is provided with an opening 40 at a location spaced from the block 28. A radially extending cylindrical wall 42 is connected to the conduit 38 about the opening 40. The wall 42 defines a cylindrical passageway 44 which is in communication with the opening 40 in the conduit 38. The wall 42 has an open top end 46.

A pair of butterfly valves 48 and 50 are provided in the passageway 44 to control the flow of atmospheric air from the open top end 46 to the interior of the conduit 38. The valves 48 and 50 are similar to the valves used in conventional carburetors.

The outermost valve 48 is operated by a mechanical linkage which is controlled by a temperature sensor in thermal communication with the engine coolant. The valve 48 acts as an auxiliary choke, restricting the flow of atmospheric air to the conduit 38 until proper engine operating temperature is reached.

The innermost valve 50 is operated by a mechanical linkage connected to the carburetor throttle (not shown). The valve 50 thus acts as an auxiliary air throttle, admitting additional air to the conduit 38 when the engine is accelerated.

The other end of the conduit 38 is connected to a manifold 52 having a plurality of openings 54 formed on an upper surface thereof. A similar manifold 56 is spaced directly above the manifold 52. The lower surface of the manifold 56 is provided with a plurality of openings 58 vertically aligned with corresponding openings 54 in the intake manifold 52.

A plurality of helical tubes 60 have inlet ends 62 connected to the openings 54 in the manifold 52 and outlet ends 64 connected to the corresponding openings 58 in the manifold 56. It will be readily apparent that the tubes 60 extend along vertical axes defined by the corresponding openings 54 and 58 in the manifolds 52 and 56.

Although the figure shows six tubes 60 arranged in a row, it is clear that the number and arrangement of the tubes 60 can be varied without departing from the present invention. It will be apparent from the discussion which follows that the completeness of the fuel vaporization achieved by the present invention varies directly with the number of tubes used and with the spacing between the tubes 60. In other words, more effective vaporization is achieved with a large number of widely spaced tubes and less effective vaporization is achieved with a small number of closely spaced tubes.

Preferably, the sum of the cross-sectional areas of the tubes 60 equals the throttle area of the carburetor 10. One embodiment which has proved particularly useful with the present invention employs 18 helical tubes 60 having diameters of about ½", lengths of about 20', and resultant length:diameter ratios of about 480:1. It is clear, however, that those parameters can be varied without departing from the present invention.

The manifold 56 is provided with a plurality of valved safety vents 66 which permit communication from the interior of the manifold 56 to the atmosphere to protect the system in case of engine backfire.

The manifolds 52 and 56 and tubes 60 are enclosed by a water tight jacket 68. An inlet port 70 formed in a lower portion of the jacket 68 is connected to the engine cooling system to receive heated coolant. An outlet port 72 formed in an upper portion of the jacket 68 is connected to the cooling system, preferably to the radiator, to return coolant from the jacket 68 to the cooling system. The jacket 68 is arranged to hold the hot engine coolant in intimate contact with the outer surfaces of the tubes 60 and manifolds 52 and 56 to effect heat exchange from the coolant to the tubes 60 and manifolds 52 and 56.

A conduit 74 has one end connected to the manifold 56 in communication with the interior thereof and an opposite end connected to the block 20 in communication with the side opening 24.

The operation of the present invention can now be readily understood.

The carburetor 10 produces an air-fuel mixture in the usual manner. The mixture is directed through the passageway 30 into the conduit 38. As is well known, the mixture is not fully vaporized.

Additional air is added to the mixture through the opening 40. The air is needed to maintain the correct air-fuel ratio for combustion when the system is used with a standard carburetor. The amount of air added to the mixture through the opening 40 is controlled by the auxiliary choke 48 and auxiliary air throttle 50. The lean mixture passes through the conduit 38 to the manifold 52 where it is directed upwardly through the plurality of helical tubes 60.

The air-fuel mixture flowing through the tubes is vaporized by a number of mechanisms.

Specifically, the small diameters of the tubes create a sizeable difference in flow velocity between the centers of the tubes and the portions adjacent the tube walls. This results in turbulence in the air-fuel flow which enhances vaporization.

The helical path which the air-fuel mixture travels in the tubes 60 creates centrifugal forces which cause the heavier droplets of fuel to be flung against the outer walls of the tubes 60. Air passing over the deposited drops causes some vaporization. The heavier drops also tend to sink so that the mixtures emitted from the outlet end 64 of the tube 60 are more perfectly vaporized.

Because the air-fuel mixture flows upwardly through the tubes 60, the heavier unvaporized droplets of fuel sink and are thus subjected to additional vaporization mechanisms. Vaporized portions of the air-fuel mixture more readily rise in the tubes 60 and are accumulated in the manifold 56 for communication to the intake manifold 12.

Hot engine coolant flowing through the jacket 68 from the inlet port 70 to the outlet port 72 heats air-fuel mixtures in the tubes 60 to further enhance vaporization.

The long path traveled by the air-fuel mixtures from the manifold 52 to the manifold 56 increases the time during which the mixture is subjected to aforementioned vaporization mechanisms, and thus further enhances vaporization.

A fully vaporized air-fuel mixture is then communicated through the conduit 74 to the intake manifold 12 for combustion in the engine cylinders.

From the foregoing, it will be readily apparent to any person of ordinary skill in the art that the specific structure shown in the figure can be varied without departing from the present invention.

For example, the structure and location of the blocks 20 and 28, particularly the passageways 22 and 30 extending therethrough, can be varied. The structure shown is preferred because it is very compact and because it requires the addition of only a minimum number of components to a standard engine.

The specific structure of the auxiliary air device can be varied. In particular, the locations of the auxiliary choke 48 and auxiliary air throttle 50 can be switched.

The structure of the jacket 58 can be varied. In particular, the outlet port 72 and the inlet port 70 can be switched. Moreover, engine exhaust could be used as the heat carrying medium in substitution for the engine coolant described.

The physical arrangement among the illustrated components and the other parts of the engine and vehicle can be varied as desired. It is preferred, however, that the auxiliary air device be connected between the carburetor 10 and the manifold 52 and that the tubes 60 be vertically aligned.

Although the system has been described with reference to internal combustion engines used in automobiles, it is clear that the present invention can be applied to any gasoline or hydrocarbon fuel engine used in any type of machine.

An advantage of the present invention is that it eliminates the reservoir of hot liquid gasoline associated with other fuel vaporization systems. This makes the present invention far safer.

While the invention has been described with reference to a specific embodiment, the exact nature and scope of the invention is defined in the following claims.

I claim:

1. Fuel vaporizing apparatus for use with an internal combustion engine having an intake manifold and a down draft carburetor which supplies mixtures of air and volatile liquid fuel comprising passageway means disposed within a heat exchanger for guiding carburetor air-fuel mixtures in a flow direction substantially opposite the flow of the carburetor, first conduit means for communicating air-fuel mixtures from the carburetor to a lower inlet means in the heat exchanger, second conduit means for communicating vaporized air-fuel mixtures from an upper outlet means in the heat exchanger to the intake manifold, the passageway means comprising one or more tubes, the lower inlet means comprising a manifold having an inlet connected to the first conduit means and plural outlets connected to the lower ends of the plural passageways, the upper outlet means comprising a manifold having plural inlets connected to upper ends of the one or more tubes and an outlet connected to the second conduit means, mounting means mounted between the intake manifold and the carburetor, having a first passageway extending therethrough from a side inlet opening in communication with the upper outlet means to a bottom outlet opening in communication with the interior of the intake manifold and a second passageway extending therethrough from a top inlet opening in communication with the interior of the carburetor to a side outlet opening in communication with the lower inlet means, all air-fuel mixtures communicated from the carburetor to the intake manifold passing through the passageway means, and means for supplying heat to the heat exchanger for heating the passageway means.

2. The apparatus of claim 1 wherein the one or more tubes are helical.

3. The apparatus of claim 1 wherein in the one or more tubes have substantially vertical axes.

4. The apparatus of claim 1 wherein the upper outlet means manifold is provided with one or more valves which provide communication from the interior of the manifold to the atmosphere.

5. The apparatus of claim 1 wherein the mounting means comprises a first block mounted on the intake manifold having said first passageway extending therethrough from a side inlet opening in communication with the upper outlet means to the bottom outlet opening in communication with the interior of the intake manifold and a second block mounted on the first block having a second passageway extending therethrough from the top inlet opening in communication with the lower inlet means, all air-fuel mixtures communicated from the carburetor to the intake manifold passing through the passageway means, the carburetor being mounted atop the second block and the second block being mounted atop the first block.

6. The apparatus of claim 1 wherein the heat exchanger comprises a jacket means enclosing the passageway means for holding heated fluid in contact with the passageway means.

7. The apparatus of claim 6 wherein the jacket means has inlet means for receiving hot liquid from the engine cooling system and outlet means for returning liquid to the cooling system.

8. The apparatus of claim 7 wherein the jacket inlet means directs liquid into a lower portion of the jacket and the jacket outlet means receives liquid from an upper portion of the jacket.

9. The apparatus of claim 1 wherein the first conduit includes port means for providing communication from the atmosphere to the interior of the first conduit means, said port means being provided with auxiliary choke means for controlling flow through the opening in response to engine temperature and auxiliary air throttle means for controlling flow through the opening in response to the setting of the carburetor throttle.

* * * * *

UNITED STATES PATENT OFFICE
CERTIFICATE OF CORRECTION

Patent No. 4,574,764         Dated March 11, 1986

Inventor(s) JOHN L. EARLE

It is certified that error appears in the above-identified patent and that said Letters Patent are hereby corrected as shown below:

On the title page inventor should read:

--Inventor: John L. Earle, P. O. Box 185
                           Forest Grove, OR  97116 --

Column 9, line 15, cancel "in".

Signed and Sealed this

Eighth Day of July 1986

[SEAL]

Attest:

DONALD J. QUIGG

Attesting Officer    Commissioner of Patents and Trademarks